(12) United States Patent
Kojima et al.

(10) Patent No.: US 7,456,234 B2
(45) Date of Patent: Nov. 25, 2008

(54) LEAD-FREE CATIONIC ELECTRODEPOSITION COATING COMPOSITION, AND ELECTRODEPOSITION COATING PROCESS

(75) Inventors: Yoshio Kojima, Nara-ken (JP); Mitsuo Yamada, Osaka-fu (JP); Satoru Uchidoi, Osaka-fu (JP)

(73) Assignees: Nippon Paint Co., Ltd., Osaka-Fu (JP); Toyota Jidosha Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 10/107,430

(22) Filed: Mar. 28, 2002

(65) Prior Publication Data

US 2002/0183421 A1 Dec. 5, 2002

(30) Foreign Application Priority Data

Mar. 28, 2001 (JP) .............................. 2001-092689
Mar. 28, 2001 (JP) .............................. 2001-092690

(51) Int. Cl.
*C25D 13/06* (2006.01)
(52) U.S. Cl. ..................................... 523/415; 204/505
(58) Field of Classification Search ................. 204/489, 204/505; 523/415
See application file for complete search history.

(56) References Cited

U.S. PATENT DOCUMENTS

| | | | |
|---|---|---|---|
| 5,536,804 A * | 7/1996 | Yamada et al. ................. 528/45 |
| 5,770,642 A * | 6/1998 | Kanato et al. ................. 523/404 |
| 6,190,524 B1 * | 2/2001 | Kollah et al. ................. 204/489 |
| 6,353,057 B1 * | 3/2002 | He et al. ..................... 525/124 |
| 6,541,120 B1 * | 4/2003 | Klein et al. ................. 428/457 |
| 6,664,345 B2 | 12/2003 | Yamoto et al. | |
| 7,049,354 B2 | 5/2006 | Yamoto et al. | |

FOREIGN PATENT DOCUMENTS

| | | | |
|---|---|---|---|
| JP | 10-204338 | | 8/1998 |
| JP | 2000-128959 | | 5/2000 |
| WO | WO-00/50522 | * | 8/2000 |

* cited by examiner

*Primary Examiner*—Kishor Mayekar
(74) *Attorney, Agent, or Firm*—Wenderoth, Lind & Ponack, L.L.P.

(57) ABSTRACT

The present invention provides a lead-free cationic electrodeposition coating composition which contains an aqueous medium, a binder resin composed of a cationic epoxy resin and a blocked isocyanate curing agent dispersed or dissolved in the aqueous medium, a neutralizing acid in order to neutralize the cationic epoxy resin, an organic solvent, and a metal catalyst, wherein the electrodeposition coating composition has a volatile organic content of 1% by weight or less, a metal ion content of 500 ppm or less, a neutralizing acid amount of 10 to 30 mg equivalent based on 100 g of binder resin solid content. The lead-free cationic electrodeposition coating composition has high throwing power, and exert a little influence on the environment due to its low VOC, low metal ion content, and reduced consumption of a coating composition itself.

2 Claims, No Drawings

LEAD-FREE CATIONIC ELECTRODEPOSITION COATING COMPOSITION, AND ELECTRODEPOSITION COATING PROCESS

FIELD OF THE INVENTION

The present invention relates to a lead-free cationic electrodeposition coating composition, more specifically, a lead-free cationic electrodeposition coating composition having low volatile organic content, low metal ion content and high throwing power. Further the present invention relates to an electrodeposition coating process which is conducted with using the lead-free cationic electrodeposition coating composition.

BACKGROUND OF THE INVENTION

According to an electrodeposition coating method, a coated film can be formed even on narrow portions of a substrate to be coated having intricate shape, automatically and continuously. Therefore, the electrodeposition coating method is widely used for primer-coating a substrate having intricate shape and being required to have high rust resistance, such as an automobile body.

Further, an electrodeposition coating method is superior in utilization efficiency of a coating composition to the other coating method, and it has conventionally been conducted as an industrial coating method due to its economical advantage. The cationic electrodeposition coating method is conducted by dipping a substrate to be coated in an cationic electrodeposition coating composition, in which a voltage is applied with using the substrate as a cathode.

In order to improve corrosion resistance of an electrodeposition coated film, various metal catalysts including lead which act as an anti-corrosion agent have been added to the electrodeposition coating composition. However, it has been required in these days to cut down content of the metal catalyst employed in an electrodeposition coating composition because metal ion, specifically lead ion exerts a harmful effect on the environment.

On the other hand, in proportion as a concern for environmental problems has been grown, harmful air pollutants (HAPs) has been regulated in quantity more tightly over developed countries. An electrodeposition coating composition contains a volatile organic solvent to some extent as a solvent for synthesizing a resin, a flow aid for an electrodeposition coated film, a conditioning agent for coating operation, and the like. Therefore, an electrodeposition coating composition which contains HAPs in a substantial amount, may hardly be used if the environmental regulation is intensified.

It is also desired that consumption of a coating composition itself is reduced, in order to save cost for conducting an electrodeposition coating method.

Deposition of a coating solid which occurs in the course of electrodeposition coating is due to an electrochemical reaction. A coated film is deposited on a surface of a substrate to be coated by a voltage being applied to an electrodeposition coating composition. The substrate is electrically insulated when a coated film is deposited thereon, and electric resistance becomes large as the deposited film becomes thick.

As a result, deposition decreases at the portion on which a coated film has been formed. Alternatively deposition increases at the portion on which no coated film has been formed. Thus, a coated film sticks to an uncoated portion of the substrate, thereby coating process is completed. As described above, a coated film is sequentially formed on the uncoated portion of the substrate during the electrodeposition coating process. Such deposition property of the electrodeposition coating composition is referred to as "throwing power" throughout the specification. An electrodeposition coating composition having good throwing power can form a coated film which has even thickness over a coated surface.

Theoretically speaking, an insulative coated film is formed on a coated surface of the substrate sequentially on the electrodeposition coating process. Therefore, throwing power must be infinity and a coated film be made uniformly over the coated surface. However in fact, since an uncoated portion of the substrate is weak in voltage to be applied, the coating solid hardly sticks to that portion. Therefore, throwing power of an electrodeposition coating composition has not been sufficient, and unevenness of film thickness may have been occurred.

An electrodeposition coated film is usually employed as a primer coating which aims at preventing corrosion or rust from generating on a substrate to be coated. Therefore, even if the substrate is complex in structure, the coated film must have not less than a certain value of thickness at the whole portion. Thus, when unevenness of film thickness is present, the thicker portion is being overcoated, and it means that the coating composition has been consumed excessively. Therefore, in order to increase utilization efficiency of a coating composition, throwing power have to be improved.

SUMMARY OF THE INVENTION

Various factors may be considered as to the reason of failing down the throwing power, but one of them seems to be low deposition property of a binder resin. Because a voltage applied to an uncoated portion of the substrate is weak, a coating solid is difficult to deposit on the substrate. In this situation, if the binder resin is improved in deposition property, the coating solid will deposit by the weak voltage, and a coated film will be formed uniformly on the whole coated surface of the substrate.

For example, a conventional electrodeposition coating composition has relatively low nonvolatile content, for example 20% by weight, and it has been difficult to sufficiently increase deposition property of the binder resin.

Another factor seems to be that ionic components contained in the coating composition such as an ionic group and a hydrophilic functional group remains in the coated film formed from the coating composition, the ionic components works as a charge transporting medium, and thereby film resistance of the coated film is reduced. Thus, in order to achieve high throwing power in an electrodeposition coating, film resistance of the coated film have to be raised by removing the factors like these.

The present invention solves the problems of the background art, and it is an object of the present invention to provide a lead-free cationic electrodeposition coating composition which has high throwing power, and exert a little influence on the environment due to its low VOC, low metal ion content, and reduced consumption of a coating composition itself.

It is another object to provide a electrodeposition coating process which can form an electrodeposition coated film having even thickness over the whole portions of a substrate to be coated with using the lead-free cationic electrodeposition coating composition.

The present invention provides a lead-free cationic electrodeposition coating composition which comprises an aqueous medium, a binder resin composed of a cationic epoxy resin and a blocked isocyanate curing agent dispersed or dissolved in the aqueous medium, a neutralizing acid in order to neutralize the cationic epoxy resin, an organic solvent, and a metal catalyst, wherein the cationic epoxy resin has a glass transition temperature of 10 to 30° C. and a number average molecular weight of 1500 to 3000, the electrodeposition coating composition has a volatile organic content of 1% by weight or less, a metal ion content of 500 ppm or less, a neutralizing acid amount of 10 to 30mg equivalent based on 100g of binder resin solid content.

The present invention further provides a lead-free cationic electrodeposition coating composition which comprises an aqueous medium, a binder resin composed of a cationic epoxy resin and a blocked isocyanate curing agent dispersed or dissolved in the aqueous medium, a neutralizing acid in order to neutralize the cationic epoxy resin, an organic solvent, and a metal catalyst, wherein the electrodeposition coating composition has a nonvolatile content of 22 to 35% by weight, a volatile organic content of 1% by weight or less, a metal ion content of 500ppm or less, a neutralizing acid amount of 10 to 30mg equivalent based on 100g of binder resin solid content, and an electrodeposit ion coated film deposited to a substrate therefrom in 10 to 20um thick, has a film resistance of 1000 to 1500 k Ω· cm²

The present invention further provides an electrodeposition coating process comprising the steps of:

dipping a substrate to be coated in an electrodeposition coating composition which comprises an aqueous medium, a binder resin composed of a cationic epoxy resin and a blocked isocyanate curing agent dispersed or dissolved in the aqueous medium, a neutralizing acid in order to neutralize the cationic epoxy resin, an organic solvent, and a metal catalyst, and which has a nonvolatile content of 22 to 35% by weight, a volatile organic content of 1% by weight or less, a metal ion content of 500 ppm or less, a neutralizing acid amount of 10 to 30 mg equivalent based on 100 g of binder resin solid content;

conducting electrodeposition coating with using the substrate as a cathode, to form a coated film having a thickness of 10 to 20 um and a film resistance of 1000 to 1500 k Ω· cm² on a surface of the substrate.

DETAILED DESCRIPTION OF THE INVENTION

An electrodeposition coating composition contains binder dispersed or dissolved in the aqueous medium, pigment, solvent and various kinds of additives such as anticorrosion agent in an aqueous medium. The binder includes a cationic resin having a functional group and a curing agent for curing the cationic resin. As the aqueous medium, ion-exchanged water, deionized water, and the like are employed.

The wording "lead-free" means that lead is not substantially contained, i.e., lead is not present in an amount so as to exert a harmful influence on the environment. Specifically it means that lead is not present in an electrodeposition bath beyond 50 ppm, preferably beyond 20 ppm.

In the present invention, a cationic epoxy resin which is obtainable by allowing an active hydrogen compound such as amine to react with an epoxy ring of an epoxy resin to introduce a cationic group by opening the epoxy group, is used as the cationic resin, and a block polyisocyanate in which an isocyanate group of polyisocyanate is blocked is used as the curing agent.

CATIONIC EPOXY RESIN

The cationic epoxy resin used in the present invention includes an amine-modified epoxy resin. The cationic epoxy resin may be those disclosed in Japanese Patent Kokai Publications No. Sho 54-4978 and Sho 56-34186. However, a cationic epoxy resin having relatively high Tg, and relatively low molecular weight is more preferred. This is because throwing power of the coating composition is improved.

Specifically, the cationic epoxy resin preferably has a Tg of 10 to 30° C., more preferably 10 to 20° C. If the Tg is less than 10° C., viscosity of the coated film becomes low, film resistance is insufficiently obtained, and throwing power becomes poor. If the Tg is more than 30° C., the coated film does not sufficiently flow by heat, and appearance becomes poor.

The cationic epoxy resin preferably has a number average molecular weight of 1500 to 3000, more preferably 1500 to 2400. If the molecular weight is less than 1500, rust resistance of the coated film becomes insufficient, and if it is more than 3000, appearance becomes poor.

It is not clear the reason why throwing power of the electrodeposition coating composition is improved by the cationic epoxy resin having relatively high Tg and relatively low molecular weight, but it is thought that the coated film is improved so as to have high film resistance which is required for good throwing power. Tg or molecular weight of the cationic epoxy resin may be controlled according to any method known to those skilled in the art.

Throught the specification, the Tg means glass transition temperature of the resin, and the value is measured by detecting thermo-alternation accompanied with glass transition of the resin with using a differential scanning calorimeter. The molecular weight means a number average molecular weight measured by the gel permeation chromatography method.

The cationic epoxy resin is typically prepared by opening all epoxy rings in a bisphenol type epoxy resin by an active hydrogen compound which can introduce a cationic group, or by opening a part of epoxy rings by the other active hydrogen compound, while opening the remaining epoxy rings by an active hydrogen compound which can introduce a cationic group.

A typical example of the bisphenol type epoxy resin is the bisphenol A type or the bisphenol F type epoxy resin. The former is commercially available in the names of EPICOAT™ 828 (Yuka-Shell Epoxy Co. Ltd., epoxy equivalent 180 to 190), EPICOAT™ 1001 (epoxy equivalent 450 to 500), EPICOAT™ 1010 (epoxy equivalent 3000 to 4000) and the like, and the latter is commercially available in the name of EPICOAT™ 807 (epoxy equivalent 170) and the like.

An oxazolidone ring containing epoxy resin as described by chemical formula 3 of paragraph [0004] in Japanese Patent Kokai Publication No. Hei 5-306327 may be used as the cationic epoxy resin. This is because a coated film which is superior in throwing power, heat resistance and corrosion resistance can be obtained.

An oxazolidone ring is introduced into an epoxy resin, for example, by the step of heating a block polyisocyanate which is blocked by lower alcohol such as methanol and a polyepoxide in the presence of basic catalyst with removing lower alcohol generated as byproduct by distillation.

Especially preferred epoxy resin is an oxazolidone ring containing epoxy resin. This is because a coated film which is superior in heat resistance and corrosion resistance, as well as superior in shock resistance can be obtained.

It is known that an oxazolidone ring containing epoxy resin can be obtained by allowing a bifunctional epoxy resin to react with a diisocyanate that is blocked by monoalcohol (i.e., bisurethane). Specific examples and preparation methods of the oxazolidone ring containing epoxy resin are disclosed, for example, in paragraphs [0012] to [0047] of Japanese Patent Kokai Publication No. 2000-128959.

These epoxy resins may be modified with an appropriate resin such as polyester polyol, polyether polyol and monofunctional alkyl phenol. Furthermore, a chain of the epoxy resin may be elongated by utilizing reaction between an epoxy group and a diol or dicarboxylic acid.

These epoxy resins are favorably ring-opened by an active hydrogen compound so that amine equivalent after ring opening is 0.3 to 4.0 meq/g, and more preferably primary amino groups make up 5 to 50% of the amino groups.

An active hydrogen compound that can introduce a cationic group includes primary amine, secondary amine and acid salt of tertiary amine, sulfide and acid mixture. Preferably, primary amine, secondary amine, and/or acid salt of tertiary amine are employed as the active hydrogen compound to prepare the primary, secondary, and/or tertiary amino group containing epoxy resin of the present invention.

Specific examples of the active hydrogen compound include butylamine, octylamine, diethylamine, dibutylamine, methylbutylamine, monoethanolamine, diethanolamine, N-methylethanolamine, triethylamine hydrochloride, N, N-dimethylethanolamine acetate, diethyl disulfide/acetic acid mixture and the like, in addition to these, secondary amines obtainable by blocking primary amines such as ketimine of aminoethylethanolamine, diketimine of diethylenetriamine. A plural kinds of amines may be used.

Block Polyisocyanate Curing Agent

Polyisocyanate used for the curing agent of the present invention refers to a compound having two or more isocyanate groups in one molecule. For example, as the polyisocyanate, it may be any of aliphatic, alicyclic, aromatic and aromatic-aliphatic.

Specific examples of the polyisocyanate include aromatic diisocyanates such as tolylenediisocyanate (TDI), diphenylmethanediisocyanate (MDI), p-phenylenediisocyanate and naphthalenediisocyanate; aliphatic diisocyanates having 3 to 12 carbon atoms such as hexamethylenediisocyanate (HDI), 2,2,4-trimethylhexanediisocyanate and lysinediisocyanate; alycyclic diisocyanates having 5 to 18 carbon atoms such as 1,4-cyclohexanediisocyanate (CDI), isophoronediisocyanate (IPDI), 4,4'-dicyclohexylmethanediisocyanate (hydrogenated MDI), methylcyclohexanediisocyanate, isopropylidene dicyclohexyl-4,4'-diisocyanate and 1,3-isocyanatomethyl cyclohexane (hydrogenated XDI), hydrogenated TDI, 2,5- or 2,6-bis (isocyanatometyl) bicyclo [2.2.1] heptane (also referred to as norbornanediisocyanate); aliphatic diisocyanates having an aromatic ring such as xylylenediisocyanate (XDI) and tetramethylxylylenediisocyanate (TMXDI); and modified diisocyanates (urethanation compounds, carbodiimide, urethodione, urethoimine, biuret and/or isocyanurate modified compounds). These may be used alone or in combination of two or more.

An adduct or a prepolymer that can be obtained by reacting polyisocyanate with polyalcohol such as ethylene glycol, propylene glycol, trimethylolpropane or hexatriol at a NCO/OH ratio of not less than 2 can also be used as a curing agent.

A block agent is those capable of adding to a polyisocyanate group, and reproducing a free isocyanate when heated to dissociation temperature though it is stable at ambient temperature.

As a block agent, those conventionally employed such as ε-caprolactam and ethylene glycol monobutyl ether may be employed. However, many of the volatile block agents among these are regulated as being HAPs, and preferably be used in minimum amount.

Pigment

An electrodeposition coating composition generally contains pigment as a colorant. Examples of such pigment include titanium white, carbon black and colcothar. However, it is preferred that an electrodeposition coating composition of the present invention does not contain pigment. This is because throwing power of the coating composition is improved.

As to an extender pigment, or a rust preventive pigment, they may be included in order to provide corrosion resistance to a coated film. The amount thereof however is preferably a ratio of 1/9 or less by weight based on a resin solid contained in the coating composition (PNV). If the ratio of the pigment is more than 1/9 by weight, throwing power of the coating composition becomes poor, and it results in wasteful consumption of the coating composition.

Examples of such pigment may be employed in the lead-free cationic electrodeposition coating composition of the present invention include extender pigments such as kaolin, talc, aluminum silicate, calcium carbonate, mica, clay and silica, rust preventive pigments such as zinc phosphate, iron phosphate, aluminum phosphate, calcium phosphate, zinc phosphite, zinc cyanide, zinc oxide, aluminum tripoliphosphate, zinc molybdate, aluminum molybdate, calcium molybdate, aluminum phosphomolybdate, and aluminum zinc phosphomolybdate.

Pigment Dispersion Paste

When pigment is used as a component of an electrodeposition coating composition, generally, the pigment is dispersed in an aqueous medium at high concentration in advance and made into a paste form. This is because pigment is of the powder form, and it is difficult to be dispersed uniformly into low concentration which is used in the electrodeposition coating composition, by one step process. Such a paste is generally referred to as a pigment dispersion paste.

A pigment dispersion paste is prepared by allowing pigment to disperse in an aqueous medium together with a pigment dispersing resin. Generally, as the pigment dispersing resin, cationic or nonionic low molecular weight surface active agents or cationic polymers such as modified epoxy resins having a quaternary ammonium group and/or a tertiary sulfonium group are used. As the aqueous medium, ion-exchange water or water containing a small amount of alcohol is used. Generally, the pigment dispersing resin and the pigment are used in a solid content ratio of 5 to 40 parts by weight to 20 to 50 parts by weight.

Metal Catalyst

A metal catalyst may be included in the lead-free cationic electrodeposition coating composition of the present invention in the form of metal ion as a catalyst for improving corrosion resistance of a coated film. The metal ion includes preferably cerium ion, bithmuth ion, copper ion, and zinc ion. These are incorporated in the electrodeposition coating composition in the form of an eluted component derived from salts combined with suitable acids, or pigments composed of the corresponding metal. The acids may be any of inorganic or organic acids described later as a neutralizing acid such as hydrochloric acid, nitric acid, phosphoric acid, formic acid, acetic acid, and lactic acid. Preferred acid is the acetic acid.

The lead-free cationic electrodeposition coating composition of the present invention contains the metal catalyst in an amount so that metal ion concentration in the coating composition is 500 ppm or less. This is because an influence exerted on the environment is minimized. Preferably, the metal ion concentration in the coating composition is 200 to 400 ppm.

As to an amount of the metal ion, when the pigment is employed in the coating composition, it must be noticed that the metal ion may also be eluted from the pigment. Thus, amount of the metal catalyst should be controlled with considering an amount of the metal ion eluted from the pigment. Examples of the metal ion eluted from the pigment include zinc ion, molybdenum ion, aluminium ion and the like.

If the metal ion is included in the electrodeposition coating composition in an amount of more than 500 ppm, an influence exerted on the environment becomes large, deposition property of a binder resin becomes poor, and throwing power of the coating composition becomes poor. The metal ion concentration of the electrodeposition coating composition is measured by conducting atomic absorption analysis on a supernatant liquid obtained by centrifugal separation of the coating composition.

Lead-free Electrodeposition Coating Composition

A cationic electrodeposition coating composition of the present invention is prepared by dispersing the metal catalyst, the cationic epoxy resin, the block polyisocyanate curing agent, and the pigment dispersion paste in an aqueous medium. In addition to these, the aqueous medium usually includes a neutralizing acid so that the cationic epoxy resin is neutralized to improve dispersibility of a binder resin emulsion. The neutralizing acid includes inorganic and organic acids such as hydrochloric acid, nitric acid, phosphoric acid, formic acid, acetic acid, and lactic acid.

When the coating composition includes a large amount of neutralizing acid, neutralize ratio of the cationic epoxy resin becomes high, the binder resin particles have high affinity with the aqueous medium, and dispersion stability thereof increases. This means that the binder resin particles hardly deposit on the substrate when electrodeposition coating is conducted, and means poor deposition property.

On the other hand, when the coating composition includes a small amount of neutralizing agent, neutralize ratio of the cationic epoxy resin becomes low, the binder resin particles have low affinity with the aqueous medium, and dispersion stability thereof decreases. This means that the binder resin particles easily deposit on the substrate when electrodeposition coating is conducted, and means good deposition property.

Thus, in order to improve throwing power of the electrodeposition coating composition, it is preferred that an amount of the neutralizing acid included in the coating composition is reduced to control neutralize ratio of the cationic epoxy resin to low level.

The neutralizing acid is specifically contained in an amount so as to be 10 to 30 mg eq., preferably 15 to 25 mg eq. based on 100 g of a resin solid of the binder which includes the cationic epoxy resin and the block isocyanate curing agent. If the amount of the neutralizing agent is less than 10 mg eq., the binder resin particles are insufficient or lack in affinity with water, and poor in dispersion stability. If the amount is more than 30 mg eq., deposition property of the coating solid decreases, a large quantity of electricity is required for conducting deposition, and throwing power also becomes poor.

In the present specification, the amount of the neutralizing acid is represented by milligram equivalent value based on 100 g of the binder resin solid which is contained in the coating composition, and is referred to as MEQ(A).

The amount of the block polyisocyanate curing agent is such that it is satisfactory to react with an active hydrogen containing functional group such as a primary, secondary and/or tertiary amino group or a hydroxyl group in the cationic epoxy resin at the time of heat curing and to give a preferable cured coated film. It is generally 50/50 to 90/10, preferably 65/35 to 80/20 when represented by solid content ratio by weight of the cationic epoxy resin based on the block polyisocyanate curing agent.

The cationic electrodeposition coating composition of the present invention may contain a tin compound such as dibutyltin dilaurate or dibutyltin oxide, or a usual urethane cleavage catalyst. The addition amount thereof is preferably 0.1 to 5.0% by weight of a resin solid.

An organic solvent is essentially required as a solvent when resin components such as a cationic epoxy resin, a block polyisocyanate curing agent, and a pigment dispersing resin and the like are prepared, and complicated procedure is required for removing the organic solvent completely. Further, when an organic solvent is contained in a binder resin, fluidity of coated film at the time of film forming is improved, and smoothness of the coated film is improved.

Examples of the organic solvent usually contained in the coating composition include ethylene glycol monobutyl ether, ethylene glycol monohexyl ether, ethylene glycol mono-2-ethylhexyl ether, propylene glycol monobutyl ether, dipropylene glycol monobutyl ether, propylene glycol monophenyl ether, and the like.

Therefore, an organic solvent have not been completely removed from a resin component conventionally, on the contrary an organic solvent is further added to the electrodeposition coating composition, thereby VOC (volatile organic content) of the coating composition is adjusted about from 1 to 5% by weight. In this context, the "volatile organic" means the organic solvent having a boiling point of 250° C. or less. The examples include the above described organic solvents.

On the other hand, the lead-free cationic electrodeposition coating composition of the present invention has the organic solvent content lower than that used to be. This is because a bad influence on the environment is prevented. Specifically, the coating composition is controlled to have a VOC of not more than 1% by weight, preferably 0.5 to 0.8% by weight, more preferably 0.2 to 0.5% by weight. If VOC of the coating composition is more than 1% by weight, an influence exerted on the environment becomes large, electric resistance of the coated film decreases due to flowability improvement of the coated film, and throwing power becomes poor.

As to the method for controlling VOC not more than 1% by weight, for example, an organic solvent employed for viscosity control at the time of conducting reaction may be reduced in its content by the reaction being conducted at higher temperature in lower solvent. An organic solvent inevitably employed at the time of conducting reaction, may be recovered by a desolvation process by such a means of employing a low boiling-point solvent, thereby VOC of the end product may be reduced. An organic solvent employed for viscosity control at the time of coating may be reduced in its content by modifying the resin with soft segment so as to have lower viscosity.

VOC may be determined by measuring amount of an organic solvent contained in the electrodeposition coating composition according to the gas liquid chromatography method by using internal standard.

The lead-free cationic electrodeposition coating composition of the present invention preferably has a nonvolatile solid content (hereinafter may referred to as "NV solid") of 22 to 35% by weight, more preferably 24 to 27% by weight. This is because a coating solid is sufficiently improved in deposition property. If the NV solid is less than 22% by weight, the improvement level by comparison with the conventional coating composition becomes poor. If the NV solid is more than 35% by weight, unevenness accompanied with drying, secondary sugging, or craters may be formed on the coated film, results in formation of surface discontinuity or poor working ability.

The NV solid in the coating composition may be adjusted by increasing or decreasing an amount of solid components with which the aqueous medium is combined. The NV solid may be determined by measuring weight of a certain amount sample of the coating composition before and after the sample is dried, for example at 105° C. for 3 hours.

In addition, the lead-free cationic electrodeposition coating composition of the present invention may contain commonly used additives for coating composition such as water miscible organic solvent, surface active agent, oxidation inhibiting agent and ultraviolet absorbing agent.

Electrodeposition Coating Process

The lead-free cationic electrodeposition coating composition of the present invention is coated by electrodeposition coating process on a substrate to be coated to form electrodeposition coated film (uncured). The substrate is not limited to but those having conductivity, and iron plate, steel plate, aluminum plate, and surface-treated objects thereof, and molded objects thereof can be exemplified.

Electrodeposition coating is carried out, in general, by filling an electrodeposition bath with the electrodeposition coating composition, and applying a voltage of usually 50 to 450 V between the substrate serving as cathode and anode. If the applied voltage is less than 50 V, the electrodeposition becomes insufficient, and if the applied voltage exceeds 450 V, power consumption increases, which leads lack of economy. Temperature of the electrodeposition bath in the case of applying the voltage is, generally 10 to 45° C.

The electrodeposition process preferably comprises the steps of (i) immersing a substrate to be coated in an electrodeposition coating composition, and (ii) applying a voltage between the substrate as cathode and anode to cause deposition of coated film. Also, the period of time for applying the voltage can be generally 2 to 4 minutes, though it varies with the electrodeposition condition.

Thickness of the electrodeposition coated film is preferably 10 to 20 um. If it is less than 10 um, rust resistance is insufficient, and if it exceeds 20 um, it leads waste of the coating composition. The electrodeposition coated film in 10 to 20 um thick, has a film resistance of preferably 1000 to 1500 k $\Omega \cdot cm^2$.if the film resistance is less than 1000 k $\Omega \cdot cm^2$,the electric resistance is insufficient, and result in poor throwing power. If the resistance is more than 1500 k $\Omega \cdot cm^{2,}$ appearance of the coated film becomes significantly poor. The electrodepositiOn coated film in 10 to 20 um thick, more preferably has a film resistance of 1000 to 1300k $\Omega \cdot cm^2$.

The film resistance of the electrodeposition coated film may be regulated by, for example controlling amount of a charge transporting medium contained in the deposited film, or adjusting viscosity of the deposited film.

The electrodeposition coated film obtained in the manner as described above is baked at a temperature of 120 to 260° C., preferably 160 to 220° C. for 10 to 30 minutes to be cured directly or after being washed with water after completion of the electrodeposition process.

The electrodeposition coated object is further subjected to intermediate coating, finish coating and/or sealer coating if necessary in accordance with its purpose.

The present invention will be further explained in detail in accordance with the following examples, however, the present invention is not limited to these examples. In the examples, "part" and "%" are based on weight unless otherwise specified. "Epoxy equivalent" and "amine equivalent" are values per solid content.

EXAMPLE A

Preparation Example A1

Preparation of Amine-modified Epoxy Resin 92 parts of 2,4-/2,6-tolylenediisocyanate (weight ratio=8/2), 95 parts of methyl isobutyl ketone (hereinafter, referred to as MIBK) and 0.5 part of dibutyltin dilaurate were loaded to a flask equipped with a stirrer, a cooling tube, a nitrogen introducing tube, a thermometer and a dropping funnel. 21 parts of methanol was added while stirring the mixture.

Starting at room temperature, the reaction mixture was allowed to rise to 60° C. by exothermic, the reaction was retained for 30 minutes, and 57 parts of ethylene glycol mono-2-ethylhexyl ether was dropped from the dropping funnel. Furthermore, 42 parts of bisphenol A-propylene oxide 5 mol adduct was added. The reaction was carried out mainly in the temperature range of 60 to 65° C., and continued until absorption based on an isocyanate group disappeared in IR spectrum measurement.

Next, 365 parts of bisphenol A type epoxy resin of epoxy equivalent 188 synthesized from bisphenol A and epichlorohydrin in accordance with a known method was added to the reaction mixture and heated to 125° C. After that, 1.0 part of benzyldimetylamine was added and allowed to react at 130° C. until epoxy equivalent became 410.

Subsequently, 61 parts of bisphenol A and 33 parts of octylic acid was added and allowed to react at 120° C. to achieve epoxy equivalent of 1190. Thereafter, the reaction mixture was cooled, and 11 parts of diethanolamine, 24 parts of N-ethylethanolamine and 25 parts of 79% solution in MIBK of ketimined aminoethyl ethanolamine were added, and was allowed to react for 2 hours at 110° C. Then, the reaction mixture was diluted with MIBK until NV solid became 80%, and an amine-modified epoxy resin having a glass transition temperature of 8° C. (solid content: 80%, number average molecular weight: 1510) was obtained.

Preparation Example A2

Preparation of Amine-modified Epoxy Resin

An amine-modified epoxy resin having a glass transition temperature of 15° C. (solid content: 80%, number average molecular weight: 1640) was prepared according to the same manner as described in Preparation example A1 except that 74 parts of bisphenol A and 17 parts of octylic acid was employed.

Preparation Example A3

Preparation of Amine-modified Epoxy Resin

An amine-modified epoxy resin having a glass transition temperature of 22° C. (solid content: 80%, number average molecular weight: 1810) was prepared according to the same manner as described in Preparation example A1 except that 87 parts of bisphenol A and no octylic acid was employed.

Preparation Example A4

Preparation of Block Polyisocyanate Curing Agent 1250 parts of diphenylmethanediisocyanate, 266.4 parts of MIBK were loaded to a flask, this was heated to 80° C., and 2.5 parts of dibutyltin dilaurate were added to this. A solution of 226 parts of ε-caprolactam dissolved in 944 parts of ethylene glycol monobutyl ether was dropped thereto at 80° C. over 2 hours. The reaction was retained at 100° C. for 4 hours, it was confirmed that absorption based on an isocyanate group disappeared in IR spectrum measurement, and left to be cooled. 336.1 parts of MIBK were added and thereby, a block polyisocyanate curing agent was obtained.

Preparation Example A5

Preparation of Pigment Dispersing Resin 222.0 parts of isophoronediisocyanate (hereinafter, referred to as IPDI) was loaded in a reaction vessel equipped with a stirrer, a cooling tube, a nitrogen introducing tube and a thermometer, and after diluted with 39.1 parts of MIBK, 0.2 part of dibutyltin dilaurate was added. Then, the reaction mixture was heated to 50° C., and 131.5 parts of 2-ethyl hexanol was dropped under dry nitrogen atmosphere over 2 hours with stirring. Reaction temperature was kept at 50° C. by cooling as necessary. As a result of this, 2-ethyl hexanol half blocked IPDI (solid content: 90%) was obtained.

87.2 parts of dimethylethanolamine, 117.6 parts of 75% aqueous solution of lactic acid, and 39.2 parts of ethylene glycol monobutyl ether were added to a suitable reaction vessel, the reaction mixture was stirred at 65° C. for half an hour to prepare a quaternarizing agent.

Subsequently 710.0 parts of EPON 829 (b)isphenol A type epoxy resin manufactured by Shell Chemical Company, epoxy equivalents 193 to 203), and 289.6 parts of bisphenol A were loaded to a reaction vessel. The reaction mixture was heated to 150 to 160° C. under nitrogen atmosphere, exothermic reaction was initially occurred. Heating was continued at 150 to 160° C. for about 1 hour, the reaction mixture was then cooled to 120° C., 498.8 parts of the prepared 2-ethyl hexanol half-blocked IPDI (IBK solution) was added.

The reaction mixture was held at 110 to 120° C. for 1 hour, 463.4 parts of ethylene glycol monobutyl ether were added, the mixture was cooled to 85 to 90° C., homogenized, and 196.7 parts of the prepared quaternarizing agent was added thereto. The reaction mixture was held at 85 to 90° C. until the acid value became 1, 964 parts of deionized water were added to finalize quaternarization of an epoxy-bisphenol A resin and to obtain a pigment dispersing resin having quaternary ammonium moiety (solid content: 50%).

Preparation Example A6

Preparation of Pigment Dispersion Paste 120 parts of the pigment dispersing resin obtained in Preparation example A5, 2.0 parts of carbon black, 100.0 parts of kaolin, 80.0 parts of titanium dioxide, 18.0 parts of aluminum phosphomolibudate and 221.7 parts of ion-exchange water were loaded into a sand grinding mill, and they were dispersed until grain size was not more than 10 um, to obtain a pigment dispersion paste (solid content: 48%).

EXAMPLE A1

Preparation of Electrodeposition Coating Composition

The amine-modified epoxy resin obtained in Preparation example A2 and the block polyisocyanate curing agent obtained in Preparation example A4 were uniformly mixed in solid content ratio of 70:30. Glacial acetic acid was added to this so that milligram equivalent value of acid based on 100 g of the binder resin solid content MEQ(A) was 35, and ion-exchanged water was slowly added for dilution. MIBK was removed under reduced pressure to obtain an emulsion having a solid content of 36%.

1500 parts of this emulsion, 540 parts of the pigment dispersion paste obtained in Preparation example A6, 1940 parts of ion-exchanged water, 20 parts of 10% cerium acetate aqueous solution, and 10 parts of dibutyltin oxide were mixed, and a cationic electrodeposition coating composition having a solid content of 20.0% was obtained. This electrodeposition coating composition had a volatile organic content in the coating composition (VOC) of 0.5%, a milligram equivalent value of acid based on 100 g of the binder resin solid content (MEQ(A)) of 25.7, and a total concentration of the eluted cerium ion and zinc ion of 210 ppm.

EXAMPLE A2

Preparation of Electrodeposition Coating Composition

The amine-modified epoxy resin obtained in Preparation example A3 and the block polyisocyanate curing agent obtained in Preparation example A4 were uniformly mixed in solid content ratio of 70:30. Glacial acetic acid was added to this so that milligram equivalent value of acid based on 100 g of the binder resin solid content MEQ(A) was 30, and ion-exchanged water was slowly added for dilution. MIBK was removed under reduced pressure to obtain an emulsion having a solid content of 36%.

1500 parts of this emulsion, 540 parts of the pigment dispersion paste obtained in Preparation example A6, 1920 parts of ion-exchanged water, 40 parts of 10% cerium acetate aqueous solution, and 10 parts of dibutyltin oxide were mixed, and a cationic electrodeposition coating composition having a solid content of 20.0% was obtained. This electrodeposition coating composition had a VOC of 0.5%, a MEQ(A) of 24.5, a total concentration of the eluted cerium ion and zinc ion of 385 ppm.

Comparative Example A1

Preparation of Electrodeposition Coating Composition

The amine-modified epoxy resin obtained in Preparation example A2 and the block polyisocyanate curing agent obtained in Preparation example A4 were uniformly mixed in solid content ratio of 70:30. Ethylene glycol 2-ethylhexyl ether was then added so that the amount based on solid content was 3%, and glacial acetic acid was added so that milligram equivalent value of acid based on 100 g of the binder resin solid content MEQ(A) was 35, and ion-exchanged water was slowly added for dilution. MIBK was removed under reduced pressure to obtain an emulsion having a solid content of 36%.

1500 parts of this emulsion, 540 parts of pigment dispersion paste prepared in Preparation example A6, 1900 parts of ion-exchanged water, 60 parts of 10% cerium acetate aqueous solution, and 10 parts of dibutyltin oxide were mixed, and a cationic electrodeposition coating composition having a solid content of 20.0% was obtained. This electrodeposition coating composition had a VOC of 0.9%, a MEQ(A) of 29.9, and a total concentration of the eluted cerium ion and zinc ion of 590 ppm.

Comparative Example A2

Preparation of electrodeposition coating composition

The amine-modified epoxy resin obtained in Preparation example A1 and the block polyisocyanate curing agent obtained in Preparation example A4 were uniformly mixed in solid content ratio of 70:30. Glacial acetic acid was added to this so that milligram equivalent value of acid based on 100 g of the binder resin solid content MEQ(A) was 30, and ion-exchanged water was slowly added for dilution. MIBK was removed under reduced pressure to obtain an emulsion having a solid content of 36%.

1500 parts of this emulsion, 540 parts of pigment dispersion paste prepared in Preparation example A6, 1920 parts of ion-exchanged water, 40 parts of 10% cerium acetate aqueous solution, and 10 parts of dibutyltin oxide were mixed, and a cationic electrodeposition coating composition having a solid content of 20.0% was obtained. This electrodeposition coating composition had a VOC of 0.5%, a MEQ(A) of 24.5, and a total concentration of the eluted cerium ion and zinc ion of 380 ppm.

The electrodeposition coating compositions prepared in Examples and Comparative Examples were evaluated as shown in the following procedures. The results were shown in Table A.

(1) Throwing Power

Ford pipe method was conducted. Evaluation was made according to the following criteria.
Good: not less than 21 cm
Poor: less than 21 cm (2) Salt Dipping Corrosion Resistance Electrodeposition coating was conducted on a cold rolled steel plate which had been treated with phosphoric acid so that the resulting electrodeposition coated film had a thickness in dry state of 20 um. The coated film was rinsed with deionized water, and was baked at 170° C. for 25 minutes to obtain a cured coated film. A linear nick reaches a surfaces of the steel plate having suitable length was made on the coated film with a cutter knife.

The coated steel plate was dipped into 5% brine at 55° C. for 240 hours. CELLOPHANE TAPE™ available from Nichiban K.K. was fixed on the surface of the coated film so that the nick was covered, the tape was then rapidly peeled. The coated film was partly removed with the tape along the flaw at certain width. Evaluation was made in accordance with maximum width of the removed part with the following criteria.
Good: less than 3 mm
Middle: 3 to 6 mm
Poor: more than 6 mm (3) Smoothness Electrodeposition coating was conducted on an untreated zinc phosphate steel plate so that the resulting electrodeposition coated film had a thickness in dry state of 20 um. The coated film was rinsed with deionized water, and was baked at 160° C. for 10 minutes to obtain a cured coated film. Surface roughness (Ra) of the cured coated film was measured by using a surface roughness meter SURFTEST-2 11 (manufactured by Mitsutoyo K.K.) under a cut off of 0.8 mm, and a scan length of 4 mm. Evaluation was made according to the following criteria.
Good: less than 0.2 um of Ra
Poor: not less than 0.2 um of Ra (4) Storage Stability The electrodeposition coating composition was stored at 40° C. for 2 weeks. Then, it was filtrated with using a mesh of No. 380. Evaluation was made according to the following criteria.
Good: Passed through
Poor: Not passed through

TABLE A

|  | Ex. A1 | Ex. A2 | CEx. A1 | CEx. A2 |
|---|---|---|---|---|
| Resin Tg/° C. | 15 | 22 | 15 | 8 |
| VOC/% | 0.5 | 0.5 | 0.9 | 0.5 |
| MEQ(A)/mgeq. | 25.7 | 24.5 | 29.9 | 24.8 |
| Metal ion conc./ppm | 210 | 385 | 590 | 380 |
| NV solid/% | 20 | 20 | 20 | 20 |
| Throwing power | G | G | P | P |
| Corrosion resist. | G | G | G | G |
| Smoothness | G | G | G | G |
| Stability | G | G | G | G |

EXAMPLE B

Preparation example B1

Preparation of Amine-modified Epoxy Resin 92 parts of 2,4-/2,6-tolylenediisocyanate (weight ratio=8/2), 95 parts of methyl isobutyl ketone (hereinafter, referred to as MIBK) and 0.5 part of dibutyltin dilaurate were loaded to a flask equipped with a stirrer, a cooling tube, a nitrogen introducing tube, a thermometer and a dropping funnel. 21 parts of methanol was added while stirring the mixture.

Starting at room temperature, the reaction mixture was allowed to rise to 60° C. by exothermic, the reaction was retained for 30 minutes, and 57 parts of ethylene glycol mono-2-ethylhexyl ether was dropped from the dropping funnel. Furthermore, 42 parts of bisphenol A-propylene oxide 5 mol adduct was added. The reaction was carried out mainly in the temperature range of 60 to 65° C., and continued until absorption based on an isocyanate group disappeared in IR spectrum measurement.

Next, 365 parts of bisphenol A type epoxy resin of epoxy equivalent 188 synthesized from bisphenol A and epichlorohydrin in accordance with a known method was added to the reaction mixture and heated to 125° C. After that, 1.0 part of benzyldimetylamine was added and allowed to react at 130° C. until epoxy equivalent became 410.

Subsequently, 87 parts of bisphenol A was added and allowed to react at 120° C. to achieve epoxy equivalent of 1190. Thereafter, the reaction mixture was cooled, and 11 parts of diethanolamine, 24 parts of N-ethylethanolamine and 25 parts of 79% solution in MIBK of ketimined aminoethyl ethanolamine were added, and was allowed to react for 2 hours at 110° C. Then, the reaction mixture was diluted with MIBK until NV solid became 80%, and an amine-modified epoxy resin (solid content: 80%) was obtained.

Preparation Example B2

Preparation of Block Polyisocyanate Curing Agent 1250 parts of diphenylmethanediisocyanate, 266.4 parts of MIBK were loaded to a flask, this was heated to 80° C., and 2.5 parts of dibutyltin dilaurate were added to this. A solution of 226 parts of ε-caprolactam dissolved in 944 parts of ethylene glycol monobutyl ether was dropped thereto at 80° C. over 2 hours. The reaction was retained at 100° C. for 4 hours, it was confirmed that absorption based on an isocyanate group disappeared in IR spectrum measurement, and left to be cooled. 336.1 parts of MIBK were added and thereby, a block polyisocyanate curing agent was obtained.

Preparation Example B3

Preparation of Pigment Dispersing Resin 222.0 parts of isophoronediisocyanate (hereinafter, referred to as IPDI) was loaded in a reaction vessel equipped with a stirrer, a cooling tube, a nitrogen introducing tube and a thermometer, and after diluted with 39.1 parts of MIBK, 0.2 part of dibutyltin dilaurate was added. Then, the reaction mixture was heated to 50° C., and 131.5 parts of 2-ethyl hexanol was dropped under dry nitrogen atmosphere over 2 hours with stirring. Reaction temperature was kept at 50° C. by cooling as necessary. As a result of this, 2-ethyl hexanol half blocked IPDI (solid content: 90%) was obtained.

87.2 parts of dimethylethanolamine, 117.6 parts of 75% aqueous solution of lactic acid, and 39.2 parts of ethylene glycol monobutyl ether were added to a suitable reaction vessel, the reaction mixture was stirred at 65° C. for half an hour to prepare a quaternarizing agent.

Subsequently 710.0 parts of EPON 829 (bisphenol A type epoxy resin manufactured by Shell Chemical Company, epoxy equivalents 193 to 203), and 289.6 parts of bisphenol A were loaded to a reaction vessel. The reaction mixture was heated to 150 to 160° C. under nitrogen atmosphere, exothermic reaction was initially occurred. Heating was continued at 150 to 160° C. for about 1 hour, the reaction mixture was then cooled to 120° C., 498.8 parts of the prepared 2-ethyl hexanol half-blocked IPDI (MIBK solution) was added.

The reaction mixture was held at 110 to 120° C. for 1 hour, 1390.2 parts of ethylene glycol monobutyl ether were added, the mixture was cooled to 85 to 90° C., homogenized, and 196.7 parts of the prepared quaternarizing agent was added thereto. The reaction mixture was held at 85 to 90° C. until the acid value became 1, 37.0 parts of deionized water were added to finalize quaternarization of an epoxy-bisphenol A resin and to obtain a pigment dispersing resin having quaternary ammonium moiety (solid content: 50%).

Preparation Example B4

Preparation of Pigment Dispersion Paste 120 parts of the pigment dispersing resin obtained in Preparation example B3, 2.0 parts of carbon black, 100.0 parts of kaolin, 80.0 parts of titanium dioxide, 18.0 parts of aluminum phosphomolibudate and 221.7 parts of ion-exchange water were loaded into a sand grinding mill, and they were dispersed until grain size was not more than 10 um, to obtain a pigment dispersion paste (solid content: 48%).

EXAMPLE B 1

The amine-modified epoxy resin obtained in preparation example B1 and the block polyisocyanate curing agent obtained in Preparation example B2 were uniformly mixed in solid content ratio of 70:30. Ethylene glycol 2-ethylhexyl ether was then added so that the amount based on solid content was 2%, and glacial acetic acid was added so that milligram equivalent value of acid based on 100 g of the binder resin solid content MEQ(A) was 24, and ion-exchanged water was slowly added for dilution. MIBK was removed under reduced pressure to obtain an emulsion having a solid content of 36%.

2670 parts of this emulsion, 1310 parts of ion-exchanged water, 20 parts of 10% cerium acetate aqueous solution, and 15 parts of dibutyltin oxide were mixed, and a cationic electrodeposition coating composition having a solid content of 24.0% was obtained. This electrodeposition coating composition had substantially no pigment, a volatile organic content in the coating composition (VOC) of 0.5%, a milligram equivalent value of acid based on 100g of the binder resin solid content (MEQ(A)) of 25.8, and a total concentration of the eluted cerium ion and zinc ion of 210ppm. Further, 250 V of voltage had been applied to for forming a coated film of 20um thick at a bath temperature of 30°C, and the coated film resistance was calculated from residual electric current at the time when the electrodeposition was finished, to be 1000k Ω·cm$^2$

EXAMPLE B2

The amine-modified epoxy resin obtained in Preparation example B 1 and the block polyisocyanate curing agent obtained in Preparation example B2 were uniformly mixed in solid content ratio of 70:30. Ethylene glycol 2-ethylhexyl ether was then added so that the amount based on solid content was 2%, and glacial acetic acid was added so that milligram equivalent value of acid based on 100 g of the binder resin solid content MEQ(A) was 20, and ion-exchanged water was slowly added for dilution. MIBK was removed under reduced pressure to obtain an emulsion having a solid content of 36%.

2670 parts of this emulsion, 1310 parts of ion-exchanged water, 20 parts of 10% cerium acetate aqueous solution, and 15 parts of dibutyltin oxide were mixed, and a cationic electrodeposition coating composition having a solid content of 30.0% was obtained. This electrodeposition coating composition had substantially no pigment, a VOC of 0.5%, a MEQ (A) of 21.8, a total concentration of the eluted cerium ion and zinc ion of 200 ppm. Further, 200 V of voltage had been applied to for forming a coated film of 20 um thick at a bath temperature of 30° C., and the coated film resistance was calculated from residual electric current at the time when the electrodeposilion was finished, to be 1300 k Ω· cm$^2$.

EXAMPLE B3

The amine-modified epoxy resin obtained in Preparation example B1 and the block polyisocyanate curing agent obtained in Preparation example B2 were uniformly mixed in solid content ratio of 70:30. Ethylene glycol 2-ethylhexyl ether was then added so that the amount based on solid content was 1%, and glacial acetic acid was added so that milligram equivalent value of acid based on 100 g of the binder resin solid content MEQ(A) was 20, and ion-exchanged water was slowly added for dilution. MIBK was removed under reduced pressure to obtain an emulsion having a solid content of 36%.

3330 parts of this emulsion, 650 parts of ion-exchanged water, 19 parts of 10% cerium acetate aqueous solution, and 15 parts of dibutyltin oxide were mixed, and a cationic electrodeposition coating composition having a solid content of 34.0% was obtained. This electrodeposition coating composition had substantially no pigment, a VOC of 0.3%, a MEQ (A) of 21.4, a total concentration of the eluted cerium ion and zinc ion of 190 ppm. Further, 300 V of voltage had been applied to for forming a coated film of 20 um thick at a bath temperature of 30° C., and the coated film resistance was calculated from residual electric current at the time when the electrodeposition was finished, to be 1450 k Ω· cm².

Comparative Example B

The amine-modified epoxy resin obtained in Preparation example B1 and the block polyisocyanate curing agent obtained in Preparation example B2 were uniformly mixed in solid content ratio of 70:30. Ethylene glycol 2-ethylhexyl ether was then added so that the amount based on solid content was 1%, and glacial acetic acid was added so that milligram equivalent value of acid based on 100 g of the binder resin solid content MEQ(A) was 35, and ion-exchanged water was slowly added for dilution. MIBK was removed under reduced pressure to obtain an emulsion having a solid content of 36%.

1500 parts of this emulsion, 542 parts of pigment dispersion paste prepared in Preparation example B4, 1901 parts of ion-exchanged water. 57 parts of 10% cerium acetate aqueous solution, and 9 parts of dibutyltin oxide were mixed, and a cationic electrodeposition coating composition having a solid content of 20.0% was obtained. This electrodeposition coating composition had a P/V of ⅓, a VOC of 1.5%, a MEQ(A) of 30.3, and a total concentration of the eluted cerium ion and zinc ion of 610 ppm. Further, 200 V of voltage had been applied to for forming a coated film of 20 um thick at a bath temperature of 30° C., and the coated film resistance was calculated from residual electric current at the time when the electrodeposition was finished, was 600 k Ω· cm².

The electrodeposition coating compositions prepared in Examples and Comparative Examples were evaluated according to the same manner as described in (1) to (4) of Example A. The results were shown in Table B

TABLE B

|  | Ex. B1 | Ex. B2 | Ex. B3 | CEx. B |
|---|---|---|---|---|
| VOC/% | 0.5 | 0.5 | 0.3 | 1.5 |
| MEQ(A)/mgeq. | 25.8 | 21.8 | 21.4 | 30.3 |
| Metal ion conc./ppm | 210 | 200 | 190 | 610 |
| P/V | 0 | 0 | 0 | ⅓ |

TABLE B-continued

|  | Ex. B1 | Ex. B2 | Ex. B3 | CEx. B |
|---|---|---|---|---|
| Voltage for coating 20 um/V | 250 | 200 | 300 | 200 |
| Film resist./kΩ×cm² | 1000 | 1300 | 1450 | 600 |
| NV solid/% | 24 | 30 | 34 | 20 |
| Throwing power | G | G | G | P |
| Corrosion resist. | G | G | G | G |
| Smoothness | G | G | G | P |
| Stability | G | G | G | G |

What is claimed is:

1. A lead-free cationic electrodeposition coating composition which comprises an aqueous medium, a binder resin composed of a cationic epoxy resin and a blocked isocyanate curing agent dispersed or dissolved in the aqueous medium, a neutralizing acid in order to neutralize the cationic epoxy resin, an organic solvent, and a catalyst releasing metal ion,
   wherein the cationic epoxy resin is an oxazolidone ring-containing amine-modified epoxy resin having a glass transition temperature of 10 to 30 ° C. and a number average molecular weight of 1500 to 3000 , and the electrodeposition coating composition has a volatile organic content of 1 % by weight or less, a metal ion content of 200 to 400 ppm, and a neutralizing acid amount of 10 to 30 mg equivalent based on 100 g of binder resin solid content,
   wherein the metal ion is one or more selected from the group consisting of cerium ion, bismuth ion, copper ion, zinc ion, molybdenum ion and aluminium ion, and
   wherein the neutralizing acid is one or more selected from the group consisting of acetic acid, lactic acid, formic acid and sulfamic acid.

2. The lead-free cationic electrodeposition coating composition of claim 1, wherein the metal ion is one or more selected from the group consisting of cerium ion, copper ion, zinc ion, molybdenum ion and aluminium ion.

* * * * *